March 16, 1965     B. EDWARDS     3,173,174
MOLDING APPARATUS FOR RIM STRUCTURE OF
THIN WALL PLASTIC CONTAINER Filed Dec. 31, 1962     3 Sheets-Sheet 1

INVENTOR.
BRYANT EDWARDS
BY
ATTORNEY

March 16, 1965  B. EDWARDS  3,173,174
MOLDING APPARATUS FOR RIM STRUCTURE OF
THIN WALL PLASTIC CONTAINER
Filed Dec. 31, 1962  3 Sheets-Sheet 2

INVENTOR.
BRYANT EDWARDS
BY Robert D. Silver
ATTORNEY

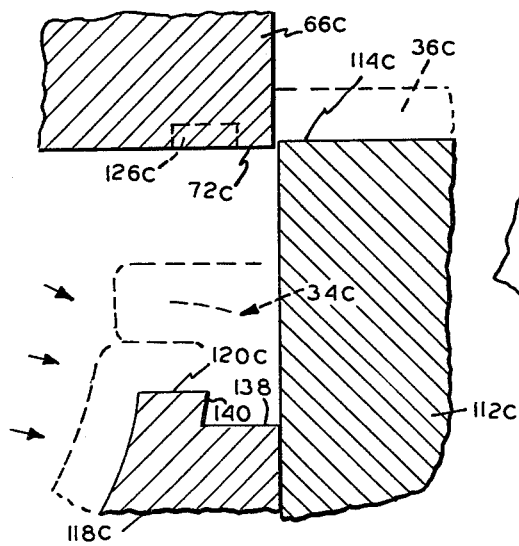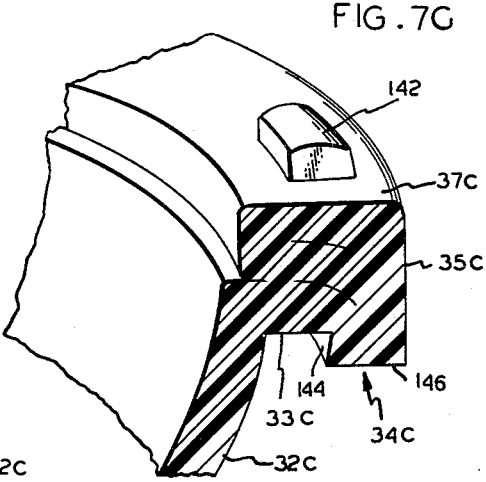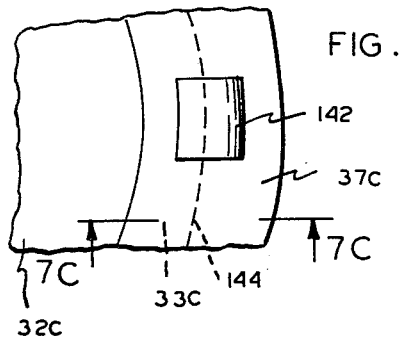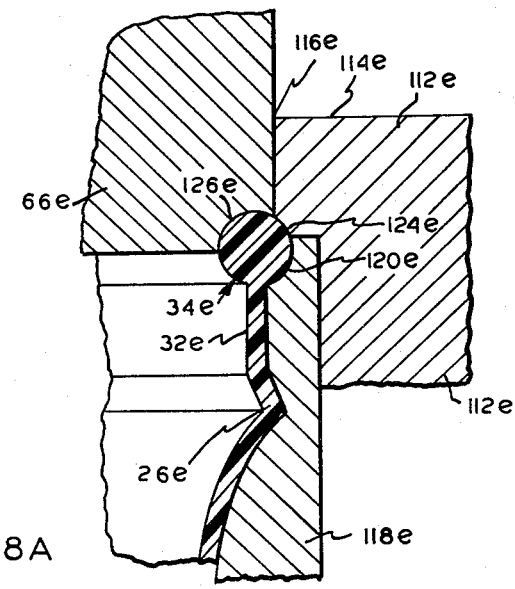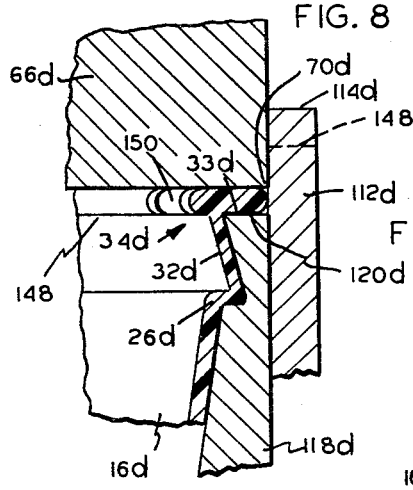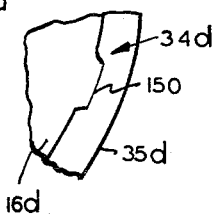

_United States Patent Office_  3,173,174
Patented Mar. 16, 1965

3,173,174
MOLDING APPARATUS FOR RIM STRUCTURE OF THIN WALL PLASTIC CONTAINER
Bryant Edwards, Clarendon Hills, Ill., assignor to Illinois Tool Works Inc., Chicago, Ill., a corporation of Delaware
Filed Dec. 31, 1962, Ser. No. 248,462
6 Claims. (Cl. 18—19)

This application is a continuation in part of my application entitled "Plastic Article, Method and Apparatus for Manufacturing Same" filed the 10th day of May, 1961, having Serial No. 109,134 and assigned to the same assignee, and relates to an apparatus for producing a rim structure on a molded plastic article.

There are various well known methods of manufacturing articles of plastic materials. One method is conventionally known as the "injection molding technique." Another well known method of manufacturing plastic articles is a sheet forming technique wherein a pressure differential and a plug cooperate to distort a thin web of sheet stock heated plastic material into its desired form. This latter technique is sometimes called the "plug assist-pressure differential-sheet forming technique."

In the manufacture of various containers, lids for containers, and other similar articles, it has been a problem, utilizing the plug assist-pressure differential techniques to get an enlarged rim structure or beaded area on the peripheral edge of the molded article. The aforementioned patent application discussed a method of burying the cutoff end or edge of a sheet formed article into plastic adjacent thereto to get a smooth beaded rim. Injection molding operations of plastic material may provide an enlarged bead structure on the peripheral edge of the article but has suffered the disability of providing a mold parting line located on the rim portion. This parting line is often rough and is sometimes undesirable in containers such as cups and the like which should be capable of being used for ordinary drinking purposes without doing damage to the human mouth. However, there are instances where having a slight rough edge on the rim, said rim being considerably thicker than sheet material thickness, is not a particular disability. Further, there are instances where it is desirable to have various configurations of rims including a varying cross section, nibs projecting in various directions, and undercuts associated with the rim for attachment of a lid or the like. Injection molding techniques are often limited as to the shapes of containers that they may form in that the molds must part for ejection of the molded article. Thus, when there are several undercuts in an article, geometric limitations on the available forms of molds and resultant articles are inherent in the injection molding techniques. Further, while injection molding techniques are suitable for many forms of containers, they are not very suitable for very thin wall containers which have a wall thickness in the neighborhood of .002 inch to .034 inch. The thinner wall thicknesses of plastic material are advantageously employed to compete with cheaper materials, particularly with throw-away type containers, lids and the like.

The instant invention is directed toward solving the problems associated with providing a reinforcing bead upon the peripheral edge of a molded article.

It is an object of this invention to provide apparatus for providing a thin walled plastic container article of manufacture having a reinforcing rim surface adjacent to the terminal ends of the container wall portion and the article so formed.

It is a further object of this invention to provide an apparatus for forming a so-called "crushed lip" on the end of a sheet formed plastic article of manufacture, the diameter of which may be exceedingly accurately controlled.

A still further object of this invention is to provide apparatus as set forth above which utilizes pressure differential in forming of the article during the mechanical pressure forming of the beaded area to maintain stability and control of the severed end.

A still further object of this invention is to provide an apparatus wherein the mold has an extensible insert which provides a cutoff edge for the sheet material, controls the diameter of the beaded article very accurately after cutoff, which may be configured to provide radially extending portions on the rim, and which may be readily reground and resharpened and placed back in use without destroying the efficacious features of the rest of the mold.

It is a further object of this invention to provide an apparatus for mechanically pressure forming the lip portion of an article during a cycle of movement of a molding machine which molds and severs the article from a web of sheet stock during a single cycle of the machine.

Novel features that are characteristic of the invention are set forth with particularity in the appended claims. The invention, both as to its organization and its method of operation, together with additional objects and advantages thereof, will be best understood by studying the following description of specific embodiments in conjunction with the accompanying drawings, in which:

FIG. 7A is a view similar to FIG. 6A showing another alternate embodiment of the invention;

FIG. 7B is a plan view of a portion of a container bead formed on the apparatus shown in FIG. 7A;

FIG. 7C is a sectional view along lines 7C—7C of FIG. 7B;

FIG. 8 is a view similar to FIGS. 3 through 5, 6A and 7A showing still another alternate form of the invention;

FIG. 8A is a plan view of lip construction manufactured on the apparatus shown in FIG. 8; and FIG. 9 is a view similar to FIG. 8 showing still a further embodiment of the invention.

Figure 1:
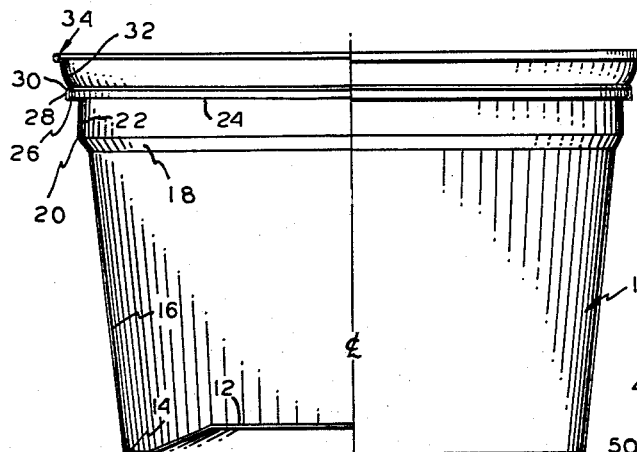
FIG. 1 is a sectional view through an article of manufacture made on the apparatus shown in FIG. 2.

Returning now to FIG. 1 of the drawings, the container 10 may be economically and conveniently formed by a plug assist-pressure differential sheet forming technique to be later described. The container 10 has good uniformity of wall thickness, preferably is formed of thermoplastic sheet stock, such as polystyrene and the like, and in its final form has a wall thickness characterized as being "very thin" so that it is economical to the point where it may be considered a "throw away" item after use thereof. While this invention shall be discussed in the context of forming containers, the apparatus employed has a substantially wider use and thus the discussion of the formation of a container is to be considered illustrative rather than limiting.

Container 10 has a bottom wall 12 which may be of any suitable configuration and diameter, which terminates at 14 with the confluence of the side walls 16 which extend upwardly and outwardly therefrom. Preferably, the side walls 16 are smooth throughout their major extent so as to be better adapted to accept printing and the like to identify various products on the exterior as well as advertising matter of various food processors and other users of the containers. At the upper extent of the side wall 16 is a radially outwardly upwardly extending portion 18 which terminates at 20 to define an undercut shoulder. Wall portion 22 preferably extends upwardly and inwardly towards the axis at a slight angle as in the neighborhood of 3° to 6°, to define an internal shoulder 24 at the confluence of portion 22 and portion 26. Portion 26 preferably extends substantially radially outwardly a short distance and joins with portions 28 and 30 to define a lid seat for retaining the contents of the container therewithin after it has been filled. Portion 32 of the side walls extends outwardly and upwardly in a curvilinear manner and terminates in a bead means 34 to be more particularly described hereinafter.

The containers 10 are nestable one within the other with a portion of wall portion 18 resting on internal shoulder 24 of the next adjacent container. It is to be noted that the axial height of portions 26, 28 and 30, as well as the axial height of portion 34 is less than the stacking height as measured by the axial height of wall portion 22.

The bead means 34 has an outer undercut surface 33, (see FIG. 1A), a substantially vertical radially outward surface 35 and a top surface 37 substantially parallel to surface 33. It is to be particularly noted that the corners where surfaces 33, 35 and 37 meet are rather well defined to provide good definition for locking an "over lid" that snaps around onto surface 33, as well as permits easy handling by automatic machinery, such as filling and capping apparatus. Another characteristic of the instant bead means 34 is that it is stress relieved during the manufacture thereof through a semicold working process and compression molding process that occurs. Thus, the bead means 34 has exceedingly good resistance to point deformation, and further upon point deformation is much less likely to crack as compared to conventionally formed rims or beads. The relief of the stresses in the bead 34 becomes quite important with such products as dairy products which are normally kept in chilled display cases at distribution outlets. Most thermoplastic materials exhibit greater tendency to crack along stress lines at lower temperatures and this is a particular problem with dairy foods and the like which are prepacked as in containers of the type shown in FIG. 1. The bead means 34 in addition to the deformation resistance also materially strengthens the upper free end of the container to thus help prevent spoilage or leakage of food materials contained within the interior thereof.

In the manufacture of containers 10, it is preferable that preheated sheet plastic material 36 be placed (preferably by automatic feeding means not shown) between upper mold means 38 and opposed lower mold means 40 which are relatively movable to each other by suitable means 42–44 shown diagrammatically by arrows. It will be realized that while a single cavity mold and mandrel will be discussed, multiple mandrels and cavities are, in fact, contemplated and indeed are preferred. A machine that is well adapted to utilize the instant inventive concepts, is shown in the copending application of Arthur Fibish having Serial No. 840,611, filed the 17th day of September 1959, and entitled "Molding Machine" which is assigned to the same asignee.

The upper mold means 38 essentially comprises an upper platen 46 (shown diagrammatically in FIG. 2) having a central aperture 48 connected by a suitable line 50 to an air pressure source 54 through a valve 52. Radially outboard of the aperture 48 is an upper annular clamp means 56 engageable with the top side of the sheet material 36, said clamp means being spring loaded by a suitable compression spring 58. Radially inboard of the annular clamp means 56, and mounted to the platen 46 is a first mandrel insert 60 having a necked down lower portion 62 which terminates at 64. Radially inboard of the first portion 60 is a mandrel second portion 66 which is fixed to platen 46 concentric with portions 60 and the clamp means 56. Portion 66 has a side wall portion 68 spaced from and concentric with necked down portion 62 of mold portion 60. A corner 70 joining surface portion 72 of portion 66 with side wall 68 defines a sheet shearing cutoff corner on the mandrel as shall become apparent through later discussion.

The mandrel second portion 66 has a central bore 74 aligned with aperture 48 for receipt of air under pressure from the source 54. A plug insert 76 is mounted in the bore 74 and extends therebelow, said insert 76 having a central bore 78 communicating with bore 74. Attached to insert 76 and depending therefrom in concentric relation to the remaining parts of the mandrel, is a plug 80 having a central bore 82 with an enlarged counterbore 84. The plug is preferably made of insulating material, such as plastic so that it will not extract any substantial heat from the hot plastic sheet fed intermediate the upper and lower mold means during the drawing operation. It will be noted that the size and geometry of the plug 80 is such that it fills a very high percentage of the mold cavity, said plug 80 serving to mechanically draw the clamped material 36 prior to the admission of air from source 54.

A lower annular clamp means 86 is disposed in opposed relationship to clamp means 56 and has a depending rod means 88 associated therewith for actuation by suitable means 90 independent of the mold actuating means 44, said means 90 being shown diagrammatically by the arrow. In the operation of the apparatus, it is preferred that the clamp means 56 and 86 firmly clamp a discrete area of the material 36 so that the plug 84 actuated by means 42 may start the mechanical stretch of the material 36 confined between the clamp means prior to the lower mold means 40 moving into telescopical relationship with the plug 80.

The lower mold means 40 essentially comprises a mold platen 92, here shown diagrammatically, having a mold base insert 94 mounted thereon with a bushing plug 96 extending therethrough for relatively movable receipt of a knock-out plug means 98 having an enlarged head. The knock-out means 98 forms the bottom of the mold cavity and is separably actuatable by means 100 relative to the platen 92 to eject the finished articles from the mold. A substantially cylindrical upstanding mold member 102 is mounted concentric to base 94 and on the lower platen 92, there being an inner mold insert 104 radially inboard thereof and disposed in good heat conducting relation thereto. The insert 104 is firmly fixed in place between base insert 94 and an annular inner shoulder at the upper end of member 102. Suitable cooling tubes 106 may be surroundingly disposed to upstanding member 102 as shown to circulate cooling fluid around the mold. Annular member 102, at a point intermediate the height thereof but somewhat close to the top portion 118, has a shoulder 107 and a threaded portion 108 extending thereabove for receipt of an external insert 110. The insert 110 defines the uppermost surfaces of the mold and has a necked down upper portion 112 which is operable to protrude between portion 62 and side wall 68 of the mandrel means during the molding cycle as is apparent from FIG. 2.

The necked down portion 112 together with its top surface 114 defines a sheet shearing cutoff corner 116 which cooperates with corner portion 70 of mandrel portion 66 for the dual function of providing a seal and to provide a shearing action on the sheet stock 36 during the formation and severing of the article 10. It will be noted, as perhaps best shown in FIGS. 3 and 4, that surface 114 is vertically spaced above portion 118 which is the top configured portion of upstanding cylindrical member 102. Surface 120 on portion 118 is disposed in opposition to portion 72 of the mandrel 66 for purposes hereinafter appearing.

Figure 1A:
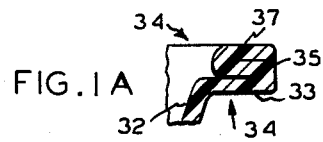
FIG. 1A is a fragmentary enlarged sectional view through the bead.
Figure 3:
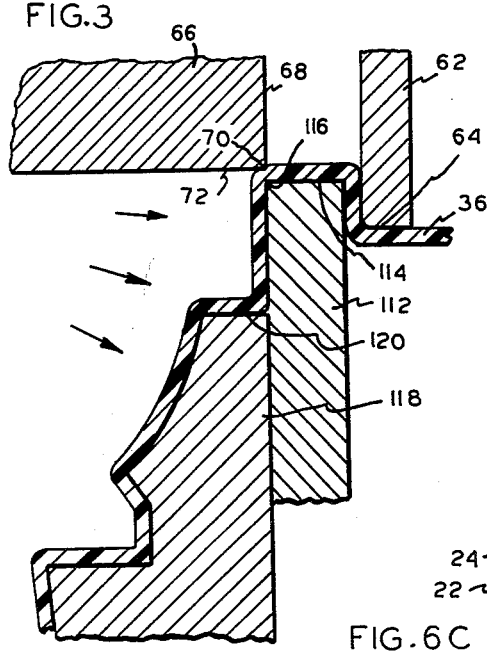
FIG. 3 is a semidiagrammatic detached view in greatly enlarged section, of certain cooperative portions of the mold and mandrel means shown in FIG. 2.
Figure 4:
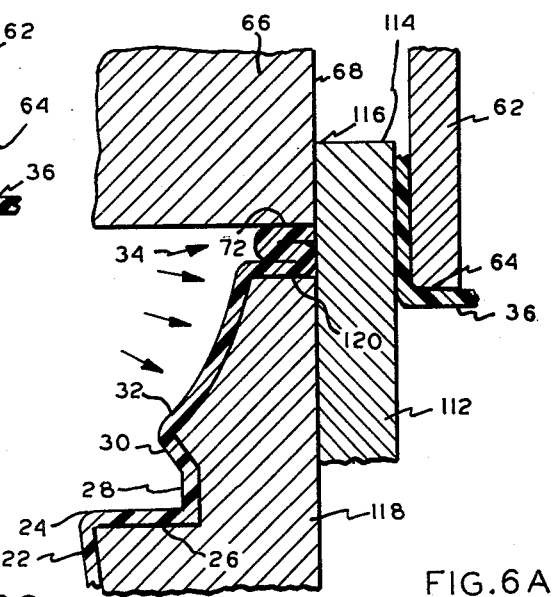
FIG. 4 is a view similar to FIG. 3 showing the same parts after they have been relatively moved to a new position.

During the molding cycle, the sheet material 36 that is clamped between the clamps 56 and 86 is first mechanically prestretched by the relative movements of the plug 80 to the clamp means and then the mold means is actuated by means 44 so that the parts assume the position shown in FIG. 3. At this juncture, valve 52 is opened causing air under pressure to cause the sheet material to leave the plug 84 and engage the female mold and assume its final form. While the positive air pressure remains on, as shown in FIGS. 3 and 4, the mandrel actuating means 42 is quickly actuated to sever the material between corners 70–116, as shown in FIG. 3 and move the mandrel toward the position shown in FIG. 4. Since the air pressure is still on, the sheet material is held adjacent to the internal diameter of the mold insert portion 112 and a bead 34 is work-formed by a compression molding process between portions 72 and 120 of the mandrel and the mold respectively. The air pressure assures tight tolerances, since it forces material of the bead into intimate engagement with portion 112 at the outer periphery of the bead. The exact amount of crushing and the exact configuration of the bead 34 may take place in a variety of manners as shall be hereinafter set forth. It is important to note, that the time interval between the parts assuming the position shown in FIG. 3 prior to introduction to air pressure and the parts assuming the position shown in FIG. 4 is very short, in the range of tenth of seconds or shorter. While some chilling effect occurs on the severed end of the heated plastic where the material is sheared between portions 70 and 116, quick actuation of the mold relative to the mandrel allows the slight skin cooling effect on the material to be overcome and the plastic material is formed into a substantially solid integral bead as shown in FIG. 1A. Due to the fact that there are opposed surfaces 72 and 120, the material surrounding the severed edge may be compressed and work-formed to the extent where it will become stress relieved, which greatly facilitates the point deformation and resistance to stress cracking as aforediscussed.

The parts of the apparatus are now moved apart to their original starting positions and the knock-out plug elevates the finished article for ejection from the molding area. The whole molding cycle, from ejection of one article, to the ejection of the next article may be performed in under three seconds. It is of economic importance to have rapid actuation of the machinery and to form the bead simultaneously with molding the article as contrasted with a post cutoff or shearing of the article from the web and/or a post bead or lip forming operation.

Figure 5:
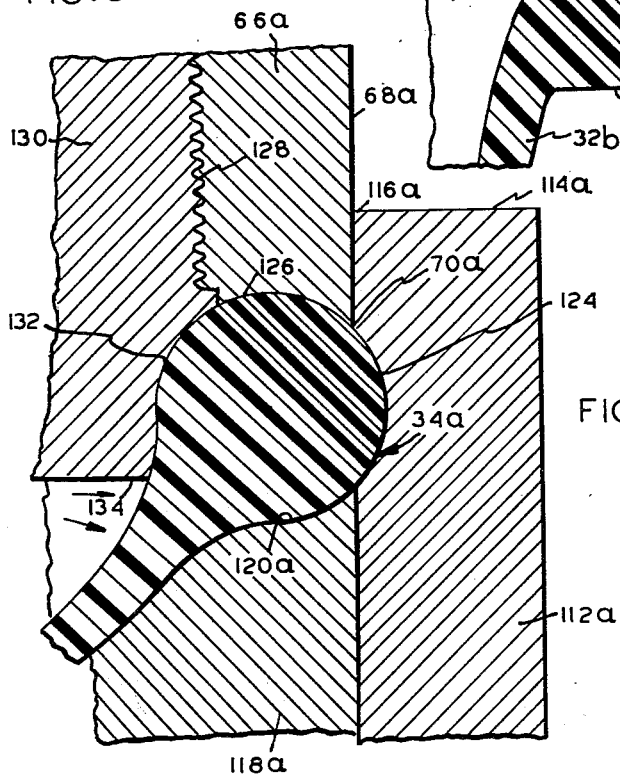
FIG. 5 is a view similar to FIGS. 3 and 4 showing an alternate embodiment of the invention.

A slight different arrangement of critical parts is shown in FIG. 5 and similar parts will be identified by similar reference numerals with the addition of the suffix $a$. The bead 34$a$ shown in FIG. 5 has a substantially bulbous characteristic and may be formed by modifying surface 120$a$ at the top of the insert 118$a$ as shown, placing a curvilinear groove 124 in insert 112$a$, and placing a curvilinear annular groove 126 in the bottom surface of mandrel portion 66$a$. To form the inside of the curvilinear portion of the bead, it is preferable to have a separate insert 130 inserted in a suitable threaded bore 128 in mandrel portion 166$a$. The insert 130 has a curvilinear complementary groove 132 opposite to groove 124 to get the desired configuration to the bead 34$a$. One disability with the apparatus shown in FIG. 5 is that the insert 108 cannot be as efficaciously resharpened as can the insert 108 shown in FIG. 2. More particularly, the threaded insert relationship shown in FIG. 2 may have the top surface 114 thereof ground so as to provide a sharp corner 116 for cutoff purposes, the amount of stock removed in the resharpening being easily compensated for by the addition of shims 109 equivalent in amount to the amount of stock removed in the top portion 112 of the insert. This is important for production runs in terms of millions of cycles.

Figures 6A, 6B, 6C:
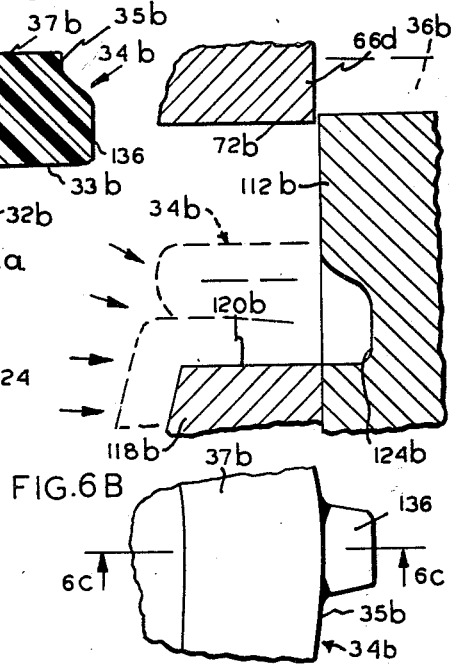
FIG. 6A is a view similar to FIGS. 3 through 5 showing still another alternate embodiment of the invention.
FIG. 6B is a partial plan view of a portion of an article manufactured on the apparatus shown in FIG. 6A.
FIG. 6C is a sectional view along lines 6C—6C of FIG. 6B.

The embodiment of the invention shown in FIGS. 6A, 6B and 6C are substantially similar to the foregoing and similar parts will be identified with similar reference numerals with the addition of the suffix $b$. As can be percieved by viewing the figures, portion 112$b$ is formed with a small depression 124$b$ immediately radially outboard of surface 120$b$. Thus, when portion 72$b$ comes into compressive engagement with the end portion of the side wall of the container to form the bead, and while the air pressure is on, the plastic material which is still in a semi-heated condition, is extruded outward into the pocket 124$b$ to provide a nib 136 as shown in FIGS. 6B and 6C. Nibs such as 136 are oftentimes important in various venting types of beads.

Figure 2:
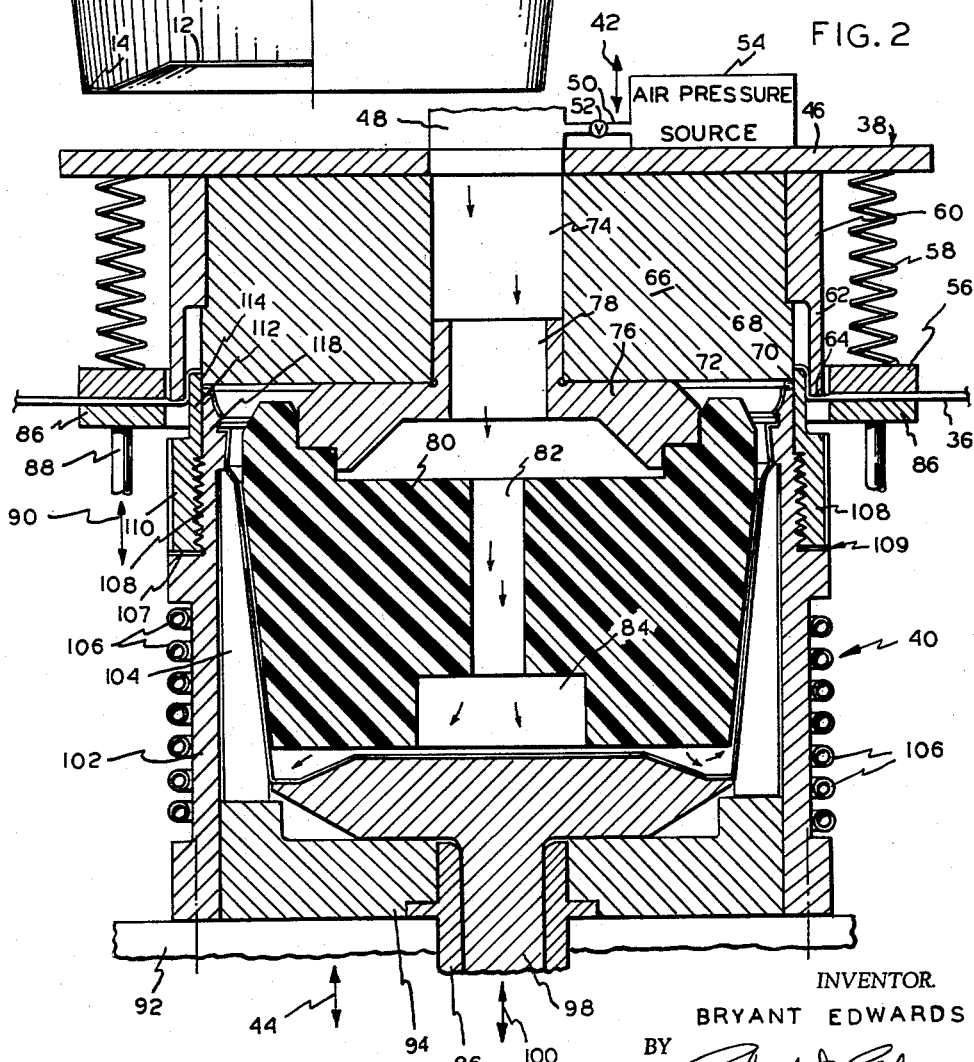
FIG. 2 is a semidiagrammatic sectional view through a mold and mandrel means operable to make the article shown in FIG. 1.

Still a different configuration of bead 34$c$ is shown in FIGS. 7A, 7B and 7C. This embodiment of the invention is substantially similar to the foregoing and similar parts shall be identified with similar reference numerals together with the suffix $c$. More particularly, the mandrel portion 66$c$ is formed with a shallow depression 126$c$, portion 112$c$ remains substantially the same as shown in FIGS. 2 through 4, and portion 118$c$ is formed with an annular channel having a bottom wall 138 spaced downwardly from surface 120$c$, the two being connected by a slightly undercut portion 140. Upon actuation of portions 66$c$ and 118$c$ relative to each other, and while continuation of the air pressure on the sheet material, it will be seen that a nib 142, which upstands from surface 37$c$ is formed on the upper portions of the bead 34$c$. Simultaneously, the radially outward underside of the bead 34$c$ is formed with an offset portion 146 having an undercut surface portion 144. Exact dimensional relationship has not been shown in the instant drawings since the sheet material thickness involved in the particular configuration determines the height, surface 114$c$ should be disposed above surface 120$c$.

Still another embodiment of the invention is shown in FIGS. 8 and 8A illustrating still another way to obtain a variable cross section of bead 35$d$. Similar parts in FIGS. 8 and 8A will be identified with similar reference numerals together with the suffix $d$. The bead 34$d$ formed in the apparatus shown in these figures is characterized by an over-squashing as compared with earlier disclosed embodiments so as to provide an internal undercut surface 148. The bead 34$d$ is also formed with an exterior severely undercut surface 33$d$ as well as the undercut surface 26$d$ in the side wall as shown. Of particular note in FIG. 8 is the small channel-shaped slot 148 formed in portion 112$d$ of the mold insert. The exact size and configuration of the slot 148 may be varied to suit but has an interesting function of providing a variable cross sectional thickness in the finished bead 34$d$. This occurs since the cutoff edge 70$d$ will coact with the bottom edge of the slot 148, wherever such a slot appears, so as to give a delayed cutoff relative to the material adjacent thereto. Thus, there is less material to be squashed in the vicinity immediately adjacent the slot 148, and hence, the bead is not as thick as measured radially adjacent and below where the slots 148 occur. This is illustrated in plan view at 150 in FIG. 8A.

FIG. 9 shows still another embodiment of the invention, and similar parts are identified with similar reference numerals together with the suffix $e$. The curvilinear bead 34$e$ formed in FIG. 9 is of note in that it indicates a configuration where the side wall 32$e$ is disposed substantially below the mid portion of the bead. This is accomplished by the geometry of the grooves 120$e$, 124$e$ and 126$e$ so that as the material is squashed, most of the material is confined between portions 120$e$ and 126$e$ to pressure form the bead 34$e$.

While the instant invention has been discussed with the use of positive air pressure on the inside of the article being formed, it is equally possible to use vacuum pressure on the outside of the container during the formation of the article, the essential aspect being that a pressure differential be created during the formation of the molded article. When vacuum pressure is used, it is not necessary that the corners 70e come into engagement with material such as shown in FIG. 3 prior to the severing step. When positive pressure is used from the mandrel side of the mold, then some method must be provided for sealing the article relative to the mandrel so that the pressure will not escape and will be used to force the material into intimate engagement with the mold surface.

Although various embodiments of the invention have been shown and described, it is with full awareness that many modifications thereof are possible. The invention, therefore, is not to be restricted except insofar as is necessitated by the prior art and by the spirit of the appended claims.

I claim:

1. An insert mold member for cut off and forming of sheet material and adapted to be attached to the outer periphery of a female sheet forming mold comprising a first portion having fastening means for engaging said female mold, a second portion extending above said first portion having an annular configuration and having a top and inner surface, the confluence of said top and inner surfaces being disposed at substantially right angles to each other to provide a cutting edge, said inner surface determining the radial size of the object to be molded and having recess means therein radially outwardly of said cutting edge to provide an undercut mold surface.

2. An insert mold member for cut off and forming of sheet material adapted to be attached to the outer periphery of a female sheet forming mold in a plug assist pressure differential sheet forming apparatus having a mandrel means portion for cooperation with said insert mold member, comprising in combination, mandrel means having a cut off portion means for cooperation with said insert mold member, said insert mold member comprising first and second portions, said first portion attachingly engaging said female mold, said second portion extending above said first portion and having a top and inner surface, the confluence of said top and inner surfaces being disposed at substantially right angles to each other to provide a cutting edge, said inner surface determining the radial size of the object to be molded, and having recess means therein and radially outwardly of said cutting edge to provide a radially extending portion on said object to be molded after cut off of the sheet material by the cooperation of said mandrel means portion with said cutting edge.

3. Apparatus for sheet forming a thin-wall container with an enlarged peripheral bead from a web of plastic material comprising a pair of annular clamp means disposed on opposite sides of a sheet of plastic material having a predetermined inner diameter, plug means disposed on one side of said sheet material and engageable therewith having a first portion, a second portion and a depending third portion of annular configuration concentric with each other and of first, second and third diameters, female mold means concentric to said clamp means and said plug means having fourth and fifth portions of annular configuration and differing diameters each of which present a surface disposed substantially parallel to said sheet material and engageable therewith on the side opposite from said plug, said fourth portion having a width dimension generally equal to the difference between the diameters of the first and second portions of said plug means less the thickness of said sheet material and being telescopically movable between said first and second portions to seal off a discrete material area from the remainder of the web while said discrete material area is being severed from said plug web by cooperating cutoff means associated with the fourth and second portions of said mold and plug means respectively, means for creating a differential fluid pressure across said discrete material area after engagement therewith by said plug means to expand it against the female mold means and form an article of desired configuration, said fifth portion and said second portion presenting opposed surfaces in alignment with each other for engaging and compresisng the severed free end of the discrete material area to form an enlarged peripheral bead on said article being formed from said discrete material area.

4. The apparatus set forth in claim 3 wherein said fourth mold portion is in the form of a threadable insert extending axially outwardly of said mold fifth portion, said insert having a side wall which, together with said opposed surfaces of said plug second portion and said mold fifth portion, confines the peripheral bead of the article being formed during the enlargement thereof to thereby accurately control the diameter of said bead.

5. The apparatus set forth in claim 4 including shim means for insertion between said mold means and said threadable insert to quickly and accurately compensate for material removed from said mold fourth portion during sharpening thereof.

6. The apparatus set forth in claim 3 wherein said plug means is formed with a bead side wall forming insert portion disposed radially intermediate and axially offset from said second and third plug portions.

References Cited by the Examiner

UNITED STATES PATENTS

| | | | |
|---|---|---|---|
| 1,449,385 | 3/23 | Dieterich | 113—42 XR |
| 1,482,732 | 2/24 | Calleson. | |
| 1,575,300 | 3/26 | Weeks et al. | |
| 1,578,337 | 3/26 | Marx et al. | 18—19 |
| 1,598,911 | 9/26 | Hockmuth et al | 18—19 |
| 1,856,319 | 5/32 | Cooper | 18—19 |
| 1,884,708 | 10/32 | Jeneson. | |
| 2,120,328 | 6/38 | Ferngren | 18—19 XR |
| 2,221,197 | 11/40 | Martin | 18—19 XR |
| 2,223,321 | 11/40 | Kempe. | |
| 2,227,920 | 2/42 | Merta. | |
| 2,377,351 | 6/45 | Martin | 18—19 XR |
| 2,541,905 | 2/51 | Amberg. | |
| 2,985,128 | 5/61 | Henrickson | 113—42 |
| 2,990,581 | 7/61 | Rowe | 18—56 |
| 3,007,206 | 11/61 | Griswold | 18—56 |
| 3,041,669 | 6/62 | Marshall et al. | 18—19 |
| 3,045,887 | 7/62 | Caine | 229—1.5 |
| 3,058,153 | 10/62 | Busch | 18—19 |
| 3,085,730 | 4/63 | Fibish | 229—1.5 |

WILLIAM J. STEPHENSON, *Primary Examiner.*

EARLE J. DRUMMOND, *Examiner.*